(No Model.) 6 Sheets—Sheet 1.

P. ECKI & J. PFEIFER.
CASH REGISTER, INDICATOR, RECORDER, AND CHECK PRINTER.

No. 532,450. Patented Jan. 15, 1895.

Fig.1

WITNESSES:

INVENTORS
Phillip Ecki
and John Pfeifer
BY
ATTORNEYS (No Model.)  6 Sheets—Sheet 4.

P. ECKI & J. PFEIFER.
CASH REGISTER, INDICATOR, RECORDER, AND CHECK PRINTER.

No. 532,450.  Patented Jan. 15, 1895.

WITNESSES:  INVENTORS
  Phillip Ecki
  and John Pfeifer
BY
ATTORNEYS

THE NORRIS PETERS CO., PHOTO-LITHO., WASHINGTON, D. C.

(No Model.) 6 Sheets—Sheet 5.
P. ECKI & J. PFEIFER.
CASH REGISTER, INDICATOR, RECORDER, AND CHECK PRINTER.
No. 532,450. Patented Jan. 15, 1895.

(No Model.) 6 Sheets—Sheet 6.

P. ECKI & J. PFEIFER.
CASH REGISTER, INDICATOR, RECORDER, AND CHECK PRINTER.

No. 532,450. Patented Jan. 15, 1895.

UNITED STATES PATENT OFFICE.

PHILLIP ECKI AND JOHN PFEIFER, OF SPRINGFIELD, OHIO; SAID ECKI ASSIGNOR TO WILLIAM F. BAUROTH AND EMIL BAUROTH, OF SAME PLACE.

CASH REGISTER, INDICATOR, RECORDER, AND CHECK-PRINTER.

SPECIFICATION forming part of Letters Patent No. 532,450, dated January 15, 1895.

Application filed November 3, 1893. Serial No. 489,960. (No model.)

*To all whom it may concern:*

Be it known that we, PHILLIP ECKI and JOHN PFEIFER, citizens of the United States, residing at Springfield, in the county of Clark and State of Ohio, have invented certain new and useful Improvements in Cash-Registers, of which the following is a specification.

Our invention relates to improvements in devices for indicating, registering and recording the amount of sales or other cash transactions.

Our invention consists in the various constructions and combinations of parts hereinafter described and pointed out in the claims.

In the accompanying drawings

Like parts are represented by similar letters of reference in the several views.

In the said drawings $a, a$, represent the main frame or casing, in the bottom of which is a cash receptacle $b$, adapted to be closed by a hinged lid $b'$. The frame $a, a$, is provided across its face at the front with guides or ways $a'$, in which is adapted to slide a moving frame $c$, carrying a bank of keys $c'$. These keys are each numbered corresponding to the amounts to be registered. Any number of keys arranged in any number of rows may be employed, depending on the capacity of the machine it is desired to produce, as will be more fully understood hereinafter. In the machine illustrated in the drawings, these keys are numbered from five to one hundred; each succeeding key being advanced in the numeration over the preceding key by five, which may be taken as the unit of registration in the present machine.

The keys are each pivoted on rods $c^2$, which extend across the movable frame $c$; three of said rods being illustrated in the present drawings. The frame $c$, is preferably formed with an opening or chamber $c^3$, which extends longitudinally entirely through the same, thus forming a front wall $c^4$, and a back wall $c^5$. These respective walls $c^4$, $c^5$, are perforated under each key, and a sliding pin $c^6$, inserted in said perforations. These sliding pins $c^6$, are each shouldered down for a portion of its length; the reduced portion having a bearing in the rear wall and the enlarged portion having a bearing in the perforations in the front wall.

Figure 1:
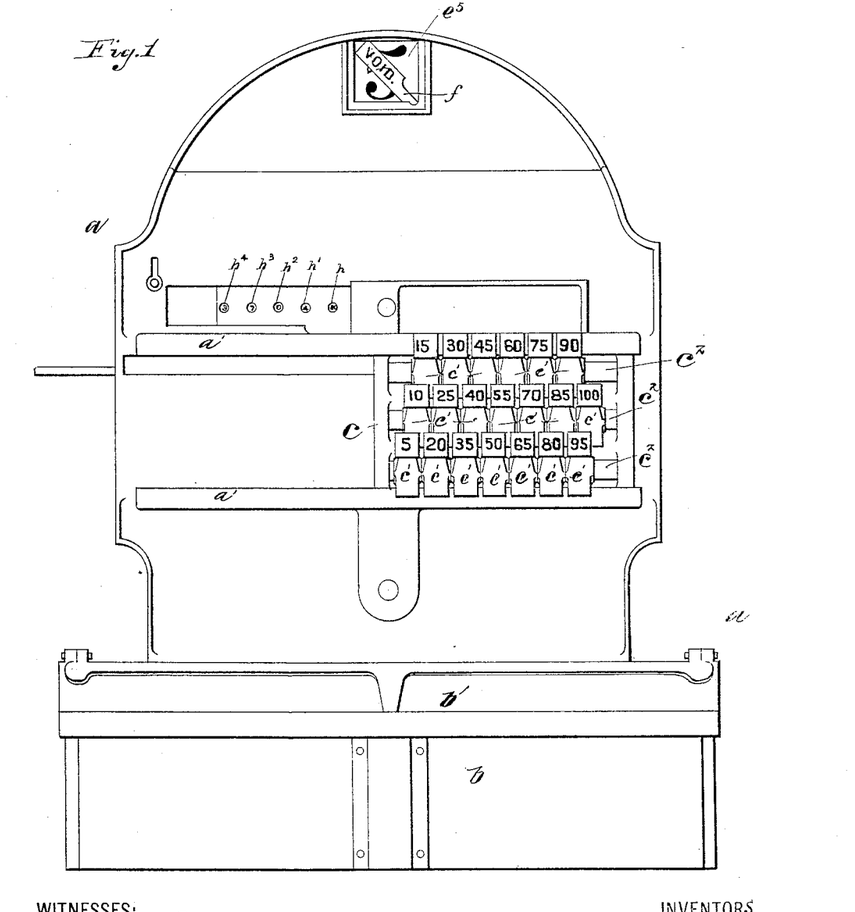
Figure 1 is a front elevation of a device embodying our invention.
Figure 2:
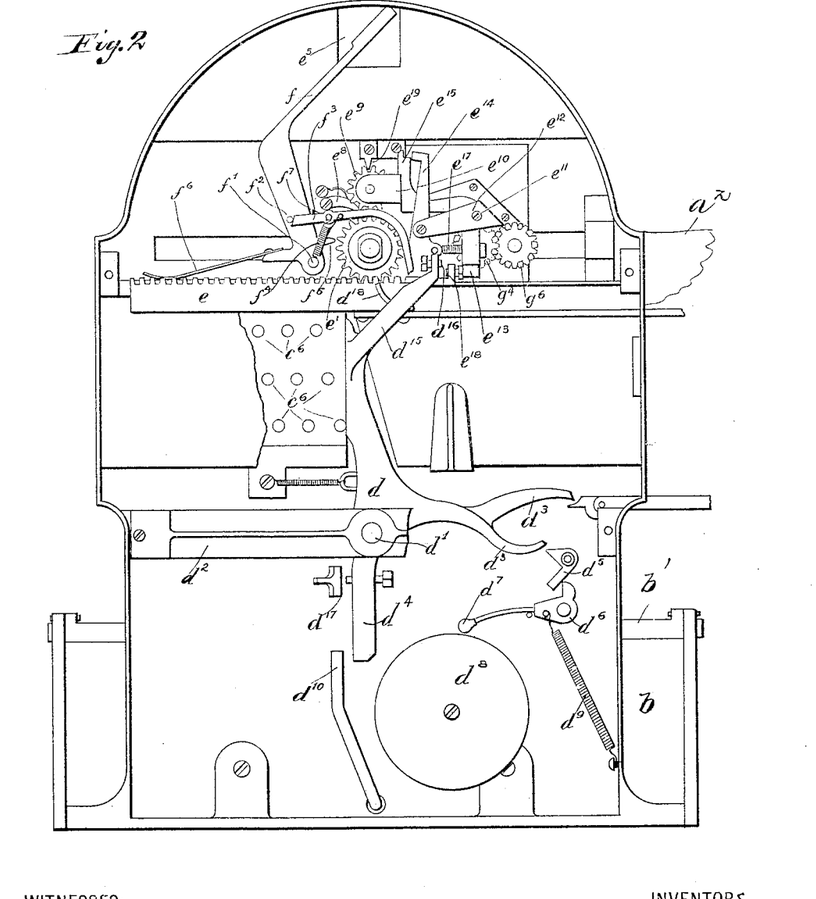
Fig. 2 is a rear elevation of the same with the rear plate removed and some of the parts broken away to better illustrate the operation thereof.
Figures 3, 4, 5, 13:
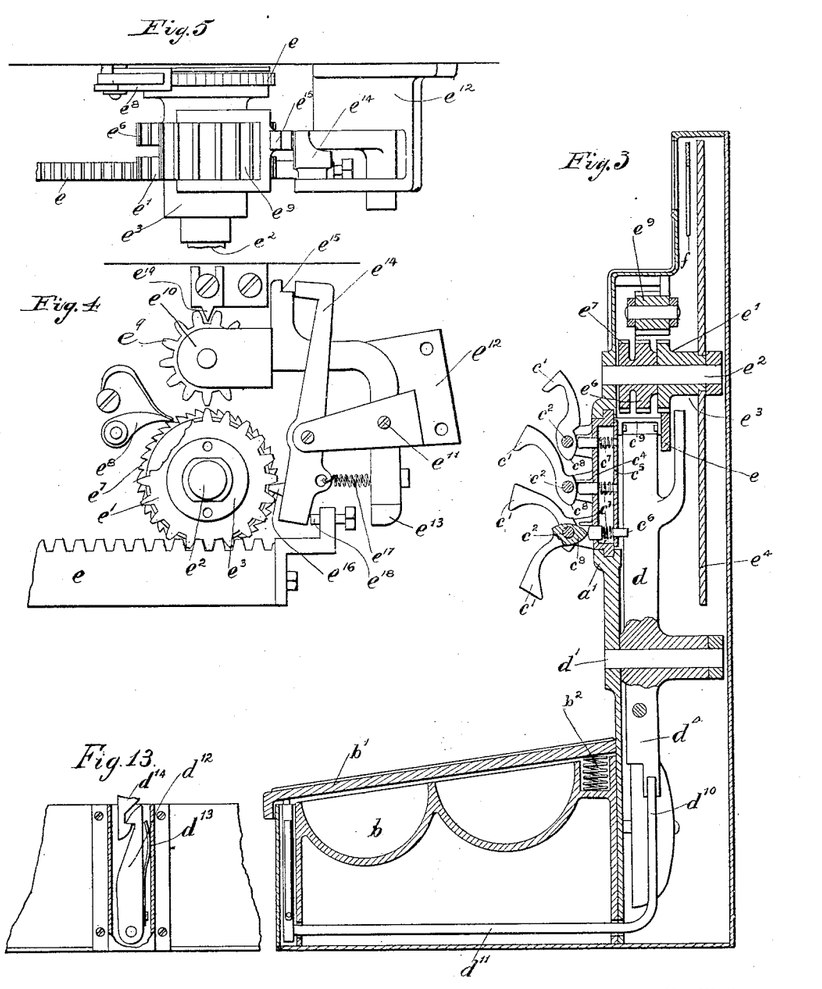
Fig. 3 is a vertical sectional elevation of the same.
Figs. 4 and 5 are detail views of some of the registering mechanism shown on an enlarged scale.
Figs. 9 to 14 inclusive, are details of some of the various parts which will be more fully referred to hereinafter.
Figure 6:
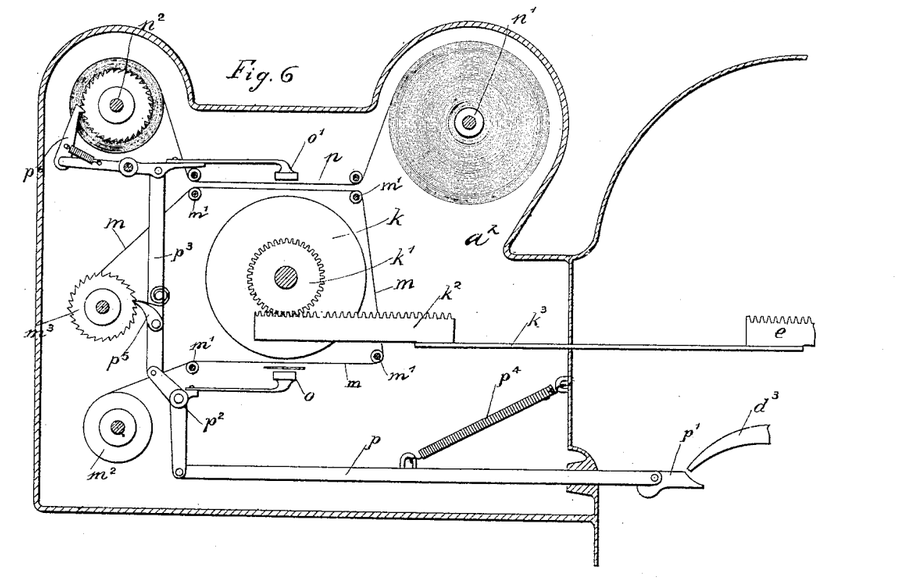
Figs. 6, 7 and 8 are detail views of a check printing device.
Figure 7:
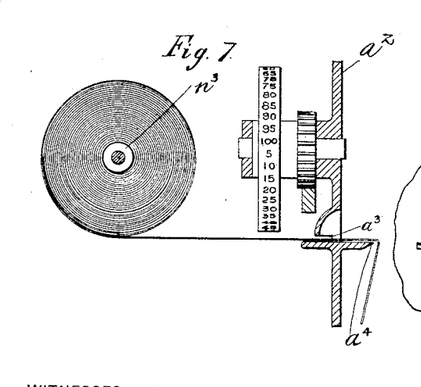
Figure 8:
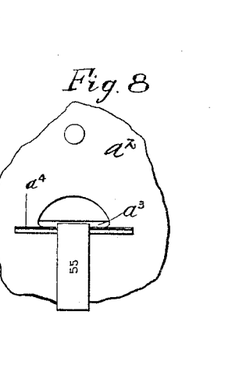
Figure 9:
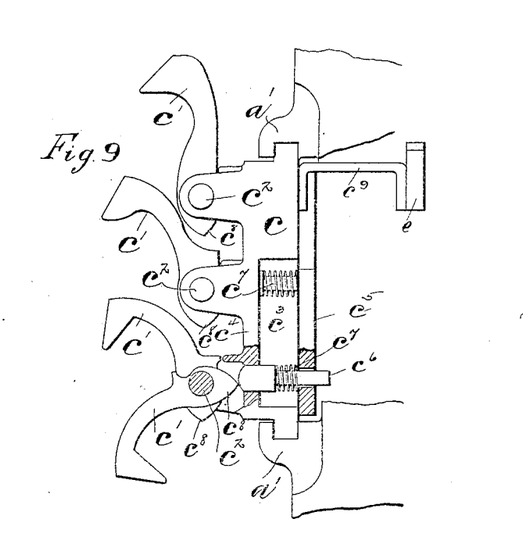
Figure 10:
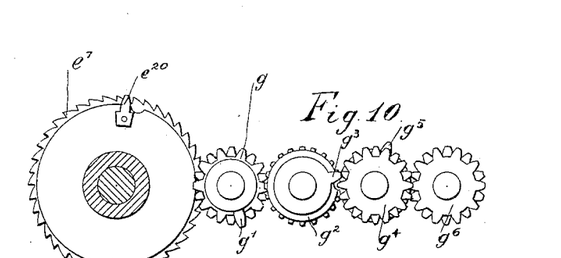
Figure 11:
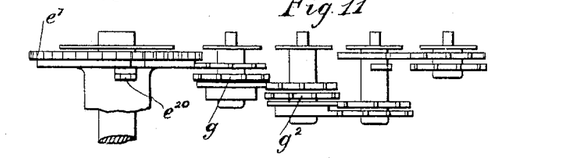
Figure 12:
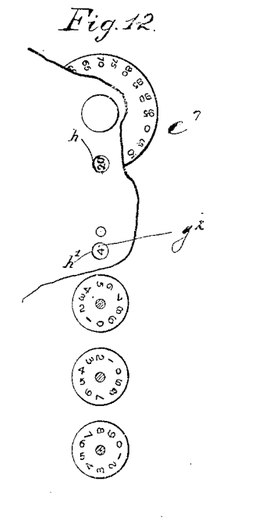
Figure 14:
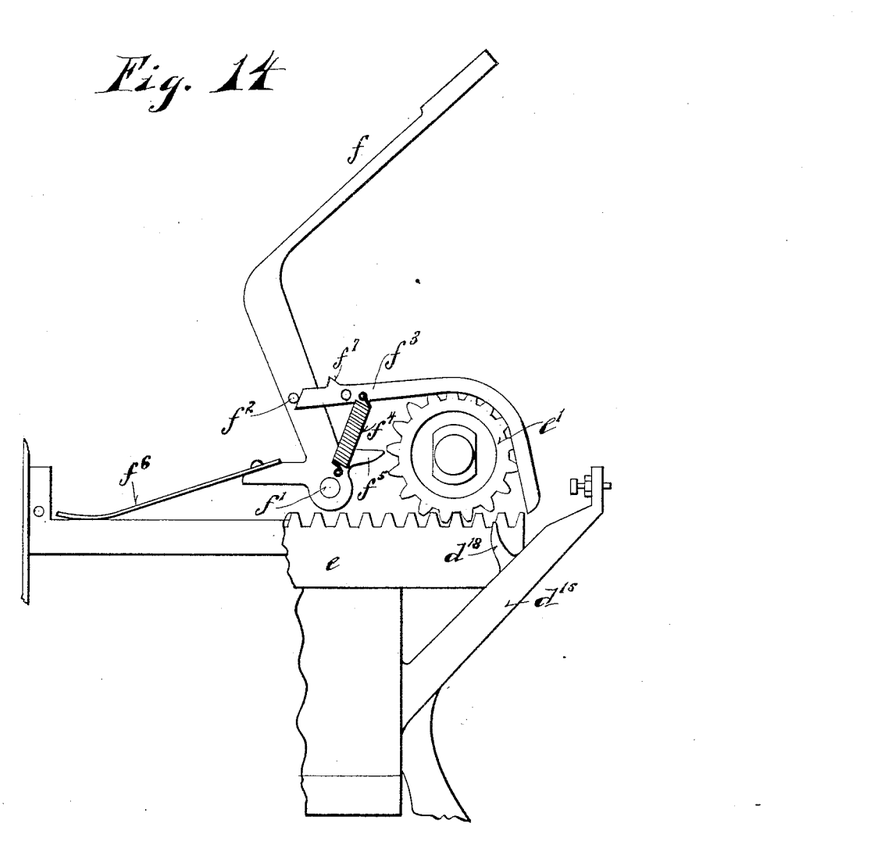

A spring $c^7$, is placed on each of the pins and rests at one end against the shoulder between the enlarged and reduced portions and at the opposite end against the rear wall; the spring being thus adapted to retain all the pins in their normal position, in which position their rear ends stand substantially flush with the rear plate $c^5$. Each of the keys $c'$, is formed at the rear with a cam face $c^8$, adapted to contact with the end of the pin $c^6$, which is preferably rounded for this purpose; the arrangement being such that when a key is turned on the pivotal rod $c^2$, the pin $c^6$, contacting therewith, is forced through the movable frame and projects from the rear wall $c^5$, thereof, as shown in Fig. 3. The pins are arranged in the removable frame in such a way that each succeeding pin stands slightly back of the preceding one, beginning at the lower left hand corner, as viewed in Fig. 1; this key being numbered five, or the lowest in the series.

Arranged within the casing and at the rear of the movable frame $c$, is a pivoted lever $d$, whose pivotal point is on a stud or shaft $d'$, extending from one side of the casing to a transverse bar $d^2$. This lever $d$, is extended upwardly from its pivotal point and stands in proximity to the rear plate of the movable frame $c$, so that when one of the pins is projected through said plate, it will contact with said lever. This lever $d$, is bifurcated at its lower end into branches $d^3$, $d^4$. One of these terminates in proximity to a pivoted pawl $d^5$, which contacts with a bell crank lever $d^6$, carrying a bell clapper $d^7$, adapted, when operated, to sound an alarm on a gong $d^8$, secured in the casing; said bell clapper, when moved, being returned to its normal position by a spring $d^9$. The other branch $d^4$, of the lever $d$, stands in proximity to an arm $d^{10}$, on the end of a shaft $d^{11}$, which is journaled in suitable bearings at the bottom of the casing and extends under the cash receptacle $b$, to the front thereof, where it carries a hook-shaped latch $d^{12}$, having a spring $d^{13}$, adapted to hold it normally in such a position as to engage with a similar hook-shaped catch $d^{14}$, on the lid $b'$, of the cash receptacle. When the lid $b'$, is released, it is adapted to be opened by a spring $b^2$. (See Fig. 3.)

The movable frame $c$, has secured to it by connecting pieces $c^9$, a rack $e$. The connecting pieces $c^9$, are adapted to extend through a slotted opening formed in the front of the casing, so that while the frame moves on the outside of the casing $a, a$, the rack $e$, is within the same. This rack $e$, meshes with a spur gear $e'$, which is journaled loosely on a stud or shaft $e^2$, extending transversely through the casing $a, a$. The spur gear $e'$, is provided with a hub $e^3$, to which is secured a dial plate $e^4$, which turns with said pinion. This dial plate is provided with numbers corresponding to the numbers on the keys, and is adapted, as the said frame is moved, to revolve so as to bring said numbers successively opposite an opening $e^5$, at the top of the casing. Arranged on the shaft $e^2$, at the side of the spur gear $e'$, is a similar spur gear $e^6$, having the same number of teeth of the same pitch as those in the spur gear $e'$. Connected to the spur gear $e^6$, is a ratchet wheel $e^7$, adapted to be engaged by a pawl $e^8$, which permits said wheel to revolve in one direction but prevents a revolution thereof in the opposite direction.

Immediately above the respective spur gears $e'$, $e^6$, is a pinion $e^9$, having a face sufficiently wide to extend across both of said spur gears. This pinion turns loosely on a shaft or pin mounted in a pivoted frame $e^{10}$, pivoted at $e^{11}$, to a bracket $e^{12}$, secured in the casing and provided with a downwardly projecting arm $e^{13}$. The lever $d$, is provided at the top with an auxiliary arm $d^{15}$, which normally stands in line with and in proximity to the arm $e^{13}$, an adjustable contacting point $d^{16}$, in the nature of a screw, being preferably employed in the end of the arm $d^{15}$, to contact with the arm $e^{13}$, when said lever $d$ is moved.

Pivoted in the bracket $e^{12}$, is a vibrating lever $e^{14}$ having a hooked shaped end, adapted, under certain conditions, to engage with a projecting spur $e^{15}$, on the pivoted frame $e^{10}$. This vibrating lever $e^{14}$, is provided on the opposite side of its pivoted center with a projection $e^{16}$, adapted to normally engage with the teeth in the spur gear $e^6$. A spring $e^{17}$ connects the arm $e^{13}$, and the vibrating lever $e^{14}$, and tends to withdraw the projection $e^{16}$, from the gear $e^6$, and also tends to move the frame $e^{10}$, so as to raise the pinion $e^9$, from contact with the respective spur gears.

It will be seen from the above description that the movable frame $c$, is free to move in its bearings from one side of the casing to the other so long as no key is depressed, and in so moving it rotates the dial plate, bringing the numbers successively opposite the opening at the top of said casing. After a key is depressed the pin operated by said key comes in contact with the lever $d$, and moves the same until it comes in contact with a stop $d^{17}$, and thus stops the movement of said movable frame. By the same movement the number on the dial plate corresponding to the number of the key is brought opposite the opening. The movement of the lever $d$, produces several different operations. The arm $d^3$ operating through the pawl $d^5$, withdraws the hammer $d^7$, from the gong $d^8$, until said arm passes the pawl $d^5$, when said hammer is released and strikes the gong by the operation of the spring $d^9$. The arm $d^4$, of the lever $d$, contacts with the arm $d^{10}$, and moves the latch $d^{12}$, so as to release the lid of the cash receptacle. The arm $d^{15}$, contacting with the arm $e^{13}$, forces the pinion $e^9$, into contact with the respective gears in which position it is held by the vibrating lever $e^{14}$, which hooks over the spur $e^{15}$, on the frame which carries said pinion. The spur gears are thus locked together and the further movement of the movable frame is prevented even though the pin be withdrawn, since the pawl $e^8$, engaging with the ratchet $e^7$, will not permit the turning of the gear in this direction. The movable frame, therefore, must be carried back to its normal position before the parts thus brought in mesh are released, and in thus moving back the spur gear $e^6$, and the ratchet wheel $e^7$, are moved with the spur-gear $e'$ a distance corresponding to that which the rack $e$ had moved, in a forward direction. As the movable frame approaches its normal position, the stop projection $e^{18}$, on said rack, contacts with the vibrating lever $e^{14}$, and thus withdraws said lever from the spur $e^{15}$, and releases the frame $e^{10}$; the spring $e^{17}$, withdrawing the pinion from mesh with the spur gears at the same time the projection $e^{16}$, on the vibrating lever $e^{14}$, engages with the spur gear $e^6$, and prevents rotation of the same in either direction. As the pinion $e^9$, is withdrawn from contact with the respective spur gears, it is forced into contact on the opposite side with a stationary tooth $e^{19}$, which prevents any further revolution of said pinion.

As before stated the dial plate carries a number for each key and one of these numbers is always opposite the opening $e^5$. In order that only that number which corresponds to the key depressed shall be exposed when the registration takes place, we provide a canceling arm $f$, adapted to normally stand across the opening $e^5$, and preferably marked with words which indicate that the number appearing there does not count. This arm $f$, is pivoted at $f'$, and is held in its normal position by a pin $f^2$, which contacts with the end of a pivoted lever $f^3$, one end of which is curved down in proximity to a projection $d^{18}$, on the lever $d$; a spring $f^4$, being adapted to hold said lever in its normal position. The arm $f$, is further provided with a projection $f^5$, adapted, when the arm is released, to engage with the teeth of the gear $e'$. As the lever $d$, is moved by the contact with the pin in the movable frame, the projection $d^{18}$, contacts with the lever $f^3$, and withdraws the same from the pin $f^2$. The arm $f$, impelled by the action of a spring $f^6$, is moved away from the opening $e^5$, until the pin $f^2$, contacts with a shoulder $f^7$, on the arm $f^3$. The dropping of the arm $f$, from the opening $e^5$, leaves the number which is to be registered, exposed at said opening. At the same time the projection $f^5$, engages with the teeth of the spur gear $e'$. As the movable frame $c$, starts to return to its normal position, the arm $f$, is, by the action of the teeth in the spur gear, returned to its normal position in front of the opening $e^5$. The spring $f^4$, carries the arm $f^3$, to its normal position, so that the end of said arm engages the pin $f^2$, and thus retains the arm $f$, in its normal position. The projection $f^5$, is carried clear from the teeth of the spur gear $e'$, by the end of the lever $f^3$, which is beveled slightly, so that as it is returned to its position by the spring $f^4$, the arm is forced backwardly until it clears the teeth in the gear $e'$.

The ratchet wheel $e^7$, is provided at one side with an elongated tooth $e^{20}$, adapted, at each revolution, to produce a movement of a counting wheel $g$; said counting wheel being moved one notch at each revolution of the ratchet wheel. The counting wheel $g$, may be provided with a similar finger $g'$, to engage with the second counting wheel $g^2$; any number of said counting wheels being employed, so that the revolutions of each wheel are counted by the next succeeding wheel. The face of the ratchet wheel is provided with numbers corresponding to those on the dial plate, which numbers are adapted to successively come opposite an opening $h$, in the case. The counting wheels are also provided with numbers from 1 to 10, adapted to come successively opposite the openings $h$, $h'$, $h^2$, &c., so that the total amount added onto the machine may be seen at a glance through the said openings.

At one side of the main casing $a$, $a$, is an auxiliary casing $a^2$, in which is journaled a printing wheel $k$, having on its periphery a double series of numbers, each corresponding to the numbers on the keys. This wheel $k$, is provided on one side with a pinion $k'$, which meshes with a rack $k^2$, connected by means of a rod or bar $k^3$, to the rack $e$, so that the printing wheel always occupies the same relative position with reference to the movable frame. Extending in proximity to this printing wheel is an inking ribbon $m$, which passes over suitable supporting rollers $m'$, from a roller $m^2$, and is adapted to be wound about a corresponding roller $m^3$.

Arranged above the printing wheel $k$, is a paper strip or tape $n$, coiled on a reel $n'$ and adapted to be wound on a corresponding reel $n^2$. A similar reel $n^3$, is arranged behind the printing wheel and is adapted to pass transversely across the face of the same at the bottom. Diametrically opposite each other, across the printing wheel $k$, are movable platens $o$, $o'$, adapted, when moved, as hereinafter described, to force the paper from the respective reels against the ribbon which contacts with the type on the periphery of the wheel; the numbers on said wheel being so arranged that the same number appears twice on said wheel and diametrically opposite each other, so that the same number is printed on each strip at the same time. These movable platens are preferably operated by means of a push rod $p$, which extends through the main casing and is provided in the end with a pivoted pawl $p'$, adapted to contact with the arm $d^3$, on the lever $d$. This push rod $p$, is connected by a bell crank $p^2$, to the platen $o$ and through a connecting link $p^3$, to the platen $o'$; these platens being thus withdrawn by the movement of the push rod; a spring $p^4$, being adapted to return said push rod to its normal position and thus force the said platens simultaneously against the respective sides of said wheel when the push rod is returned to its normal position. The pivoted pawl $p^5$, on the link $p^3$, engages at each successive movement with the ratchet wheel on the roller $m^3$, so as to produce a slight movement of the inking ribbon at each successive impression; a similar pawl $p^6$, engaging with a ratchet on the reel $n^2$, being adapted to move the paper tape so as to carry the impression forward sufficiently to permit the succeeding impression on the tape. The end of the paper strip carried on the reel $n^3$, is extended through an opening $a^3$, in the casing $a^2$, provided for the purpose, in convenient reach of the operator, who, after the impression is made, takes hold of the strip and pulls the same until the number appears and tears it off in contact with a straight edge $a^4$, provided for this purpose on the casing. The numbers which print on the lower strip are preferably made much larger than those which print on the reel strip. It will thus be seen that at each movement of the frame, after a key is depressed, the cash receptacle is opened, an alarm sounded, the number corresponding to the key depressed printed on a strip, which may be torn off, a corresponding number printed on a tape which is retained in the machine to make a record. At the same time the registering mechanism is thrown into operation, so that as the frame is returned to its normal position, the amount is registered on the counting wheels.

It will be seen that all the operations of opening the cash drawer, sounding the alarm, indicating the amount, registering on the counting wheels, printing the check and printing the record is accomplished by the simple operation of depressing a key and moving the frame containing said key until it contacts with the lever $d$. After the contact has been made, all further movement of the frame is prevented until the said frame is moved back to its normal position.

The device as thus described it will be seen is extremely simple and is such as is not liable to get out of order, and it may be cheaply built, and at the same time is very effective in operation.

Having thus described our invention, we claim—

1. In a cash register, a movable frame having a series of keys, pins operated by said keys to project through said frame in successive order, and at right angles to the direction of travel of said frame, a pivoted lever adapted to be moved by said frame when either of said pins is projected through said frame so as to contact with said lever, and means, as described, connected to said lever for opening a cash receptacle and sounding an alarm and throwing the registering mechanism into operation with said movable frame, substantially as specified.

2. In a cash register, a movable rack and a spur gear engaging with said rack, means for moving said rack to a predetermined position, an auxiliary gear arranged adjacent to said rack gear, and a movable pinion adapted, when said rack is moved to a predetermined position, to contact with the respective gears and thus cause the same to move together, substantially as and for the purpose specified.

3. A movable frame, a rack connected to said frame, a gear meshing with said rack, an auxiliary gear adjacent to said rack gear, and a movable pinion adapted to be set into operation by the movement of said frame to mesh with the respective gears and cause the same to move together, substantially as specified.

4. In a cash register, a movable frame, a series of movable pins in said frame, a rack also connected to said frame, and a spur gear meshing with said rack, an auxiliary gear adjacent to said spur gear, and a movable pinion adapted to mesh with both of said gears, a lever adapted to be moved by said frame when one of said pins is projected through said frame so as to contact with said lever, and means, substantially as described, for throwing said pinion into mesh with said gears by the movement of said lever, substantially as specified.

5. The combination with the laterally moving rack and a spur gear in mesh therewith, a dial plate revolving with said spur gear, an auxiliary gear adjacent to said spur gear, a registering device connected to said auxiliary gear, a pinion adapted to mesh with both of said gears, and means, substantially as described, for causing said pinion to engage and disengage with the respective gears and cause them to revolve together by the predetermined movement of said rack, substantially as specified.

6. The combination with a laterally moving frame having a series of movable pins, and a pivoted lever adapted to be moved with said frame when either of said pins is projected from said frame so as to contact with said lever, a normally-closed cash receptacle, and means, substantially as described, for opening said cash receptacle by the movement of said lever, substantially as specified.

7. In a cash register, a rotating dial plate having numbers adapted to come successively opposite an opening in the casing containing said dial plate, a spur gear connected to said dial plate, and a rack meshing with said gear, a pivoted arm adapted to stand normally across the opening opposite said dial plate, said arm having a projection adapted, when released, to engage with the teeth of the gear, and a pivoted stop lever to hold said arm normally out of engagement with said gear, and an intermediate connection, substantially as described, for moving said stop lever when said rack has moved to a predetermined position so as to release said arm and permit the same to move away from said pinion, substantially as specified.

8. In a cash register, a movable frame having a series of pins, a pivoted lever adjacent to said frame adapted to be moved with said frame when either of said pins is projected from said frame so as to contact with said lever, a rack connected to said frame, and a gear meshing with said rack, a dial plate connected to said gear, and an arm normally standing across said dial plate, a stop lever contacting with said arm, a projection on said pivoted lever to contact with said stop lever so as to release said arm when said pivoted lever is moved by the movement of said frame, substantially as specified.

9. The moving frame having the rack, a gear meshing with said rack, and an auxiliary gear adjacent thereto having a ratchet wheel connected thereto, a pawl engaging in said ratchet wheel, and a movable pinion adapted, when said rack has reached a predetermined position, to be brought into mesh with both of said gears and cause the same to move together, substantially as and for the purpose specified.

10. In a cash register, a pivoted lever having auxiliary arms, as described, a movable plate having contacting pins adapted, when moved to an unusual position, to be brought into contact with said lever by the movement of said plate, the auxiliary arms of said lever being adapted to operate an alarm, open the cash receptacle and to set into operation the cash registering mechanism, substantially as specified.

11. In a cash register, a movable frame having a series of pins arranged in successive order and adapted, when moved to an unusual position, to be brought into contact with the pivoted lever by the movement of said plate, said pivoted lever being provided with an extending arm adapted to contact with a pivoted pawl which engages with a pivoted hammer adjacent to a gong, so that a movement of said lever sounds an alarm on said gong, substantially as specified.

12. A cash receptacle, a spring actuated lid thereon, a spring catch adapted to retain said lid, a connection from said spring catch to a movable arm, a pivoted lever adjacent to said arm, a movable frame having a series of keys adapted, when moved to an unusual position, to be brought into contact with said lever by a movement of said frame, whereby a movement of said frame unlocks said cash receptacle, substantially as specified.

13. A movable rack, a gear meshing with said rack, an auxiliary gear adjacent to said rack gear, a pivoted frame carrying a pinion adapted to mesh with both of said gears, a vibrating lever having a hook-shaped projection adapted to engage said pivoted frame and hold said pinion in mesh with said gears, a projection on said rack adapted to contact with said vibrating lever and thus release said pinion when the rack is returned to its normal position, substantially as specified.

14. In a cash register, a normally inactive registering device, a movable frame carrying a series of keys, as described, a pivoted lever adapted, when moved, to connect said cash registering device with said movable frame, and contacting devices connected to said keys, each adapted, when operated by its key, to be brought into contact with said pivoted lever by a movement of said frame and thus move the same, substantially as specified.

15. A normally-inactive cash registering device, a movable frame having a series of keys, an intermediate mechanism adapted by a movement of said frame to establish a connection between said frame and said cash registering device, movable pins on said frame arranged in successive order and adapted when moved to be brought into contact with said intermediate mechanism and operate the same, and means for preventing a further movement of said movable frame in a forward direction after said registering device is connected therewith, substantially as specified.

16. A normally inactive cash registering mechanism adapted to move in one direction only and having stop devices to prevent its movement in the opposite direction, a movable frame carrying a series of movable pins arranged in successive order, and a pivoted lever adapted to be engaged by said pins when moved to an unusual position, said lever being, by its movement, adapted to connect said registering mechanism with said movable frame, whereby said registering mechanism is operated by the return of said movable frame to its normal position, and a further movement of said frame in a forward direction is prevented after said registering device is connected therewith, substantially as specified.

17. A normally inactive registering mechanism, a movable frame having a series of keys adapted, by the operation of intermediate devices, to be connected to said registering mechanism, pins in said movable frame operated by said keys to contact with said intermediate devices and operate the same by a movement of said plate, a printing wheel also connected with said movable frame and moving synchronously therewith, and a moving platen operated to make an impression from said printing wheel when said registering mechanism is thrown into connection with said movable frame, substantially as specified.

18. A movable frame having a series of keys thereon, a rack connected to said frame, and a gear meshing with said rack, a printing wheel also connected with said rack and adapted to revolve synchronously with a gear meshing with said rack, stop pins on said frame connected to said keys, a pivoted lever to contact with said stop pins, a normally inactive registering mechanism adapted to be connected to a gear meshing with said rack by a movement of said pivoted lever, and a moving platen operating in connection with said printing wheel also operated by said pivoted lever to make an impression from said printing wheel, substantially as specified.

19. A moving frame having a series of keys, a moving pin connected to each of said keys, a pivoted lever adapted to be engaged by said pins when moved to an unusual position, a rack connected to said frame and a printing wheel operated by said rack, said printing wheel carrying numbers corresponding to the numbers on the keys on said frame, a movable platen operated by said pivoted lever to make an impression from said printing wheel when said frame has moved to the limit of its position determined by the key depressed, substantially as specified.

20. A movable frame and series of keys, a pivoted lever and means connected with said keys for causing said lever to move with said frame when one of said keys is depressed, a stop connected to said lever to limit the movement thereof and thus limit the movement of said frame, a printing wheel connected to said frame so as to move therewith, said printing wheel being provided with numbers corresponding to the numbers on the keys on said frame, and a movable platen operated by said pivoted lever to produce an impression from said printing wheel when said frame has reached the limit of its movement as determined by the key depressed, substantially as specified.

21. In a cash register, a moving frame having a series of keys, a rack connected to said frame, and a printing wheel having a pinion meshing with said rack, said printing wheel being provided on its periphery with a double series of numbers with the corresponding numbers in each series diametrically opposite to each other, paper strips passing in proximity to said printing wheel on opposite sides, movable platens diametrically opposite to each other and adapted to operate said paper strips to produce an impression from said wheel, a pivoted lever adapted to be operated by said frame, and a connection from said pivoted lever to said moving platens, whereby an impression is formed simultaneously on the respective strips when said frame has reached the limit of its position as determined by said pivoted lever, substantially as specified.

22. A movable frame, a series of keys thereon, movable pins arranged in successive order on said frame and adapted to be operated by said keys, a pivoted lever to contact with said pins when said pins are moved synchronously to an unusual position, a dial plate connected to said frame so as to move therewith, said dial plate having numbers adapted to be brought successively opposite an opening, a pivoted frame adapted to normally stand across said opening, and a connection from said pivoted lever to produce a movement of said frame to cause it to recede from said opening when said lever is moved by the contact with said movable frame, substantially as specified.

23. A pivoted lever and a moving frame having a series of movable projections adapted, when moved to an unusual position, to contact with said lever and cause the same to move with said frame, a dial plate also moving synchronously with said frame, numbers on said dial plate to come successively opposite an opening on the arm normally standing across said opening, a stop for holding said arm in its normal position, and means, as described, for operating said stop so that said arm shall recede from said opening when said lever is operated by said movable frame, substantially as specified.

24. A dial plate and a spur gear attached to said dial plate, mechanism connected with said gear to move said dial plate so as to bring the numbers thereon successively opposite an opening, a pivoted arm normally standing across said opening, and a stop lever adapted to hold said arm in its normal position, means for operating said stop lever to permit said arm to move from said opening, a projection on said arm to engage with said spur gear when the arm is moved from its normal position, and a spring to operate said stop lever to cause it to re-engage with said arm when said arm is moved to its normal position by a further revolution of said wheel, substantially as specified.

25. In a cash register, a dial plate, a spur gear attached to said dial plate and a rack operating said gear, means for moving said rack to cause the numbers on said dial plate to come successively opposite an opening, normally inactive cash registering mechanism, a moving frame carrying a pinion adapted to be thrown into mesh with said spur gear and thus connect said registering mechanism with said rack, a pivoted arm to engage with said frame and hold said pinion in mesh with said gear, and a projection on said rack adapted, when said rack has reached its normal position, to contact with said pivoted arm and cause the same to release said pivoted frame, substantially as specified.

26. In a cash register, a movable rack, a spur gear operating in said rack, and an auxiliary gear adjacent to said rack gear and lying adjacent thereto, a pinion supported in a movable frame adapted to be brought into mesh with said gears and thus cause the same to revolve together, and a holding device for holding said pinion in mesh with said gears, and means on said rack for withdrawing said holding device when said rack has returned to its normal position, substantially as and for the purpose specified.

27. The pivoted frame carrying the pinion, a pivoted arm adapted to contact with and hold said frame when moved to an unusual position, a spring connecting said arm and frame, a spur gear adjacent to said pinion, and a rack operating said spur gear, and means for operating said frame to cause said pinion to engage with said gear when said rack is moved to a predetermined position, and a stop projection on said rack to engage with said pivoted arm and thus release said frame and disengage said pinion from said gear when said rack has returned to its normal position, substantially as specified.

28. A normally inactive registering mechanism and a spur gear for operating the same, a ratchet connected to said spur gear and a pawl engaging with said ratchet, a moving rack and a spur gear engaging with said rack, said rack gear being arranged coincident with and adjacent to said registering gear, a moving frame carrying a pinion adapted, when said frame is moved to an unusual position, to mesh with both of said gears, a moving arm adapted to engage said frame and hold said pinion in mesh with said gears when moved to an unusual position, and a projection on said rack adapted to contact with said arm and thus release said frame, and a spring to return said frame to its normal position, so as to disengage said pinion from said wheels when the rack has returned to its normal position, substantially as specified.

In testimony whereof we have hereunto set our hands this 24th day of October, A. D. 1893.

PHILLIP ECKI.
JOHN PFEIFER.

Witnesses:
ROBERT C. RODGERS,
PAUL A. STALEY.